United States Patent
Hwang et al.

(10) Patent No.: US 8,385,957 B2
(45) Date of Patent: Feb. 26, 2013

(54) APPARATUS AND METHOD FOR TRANSMITTING DATA BASED ON QUANTIZED CHANNEL STATE INFORMATION

(75) Inventors: Duck Dong Hwang, Yongin-si (KR); Ki Il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 950 days.

(21) Appl. No.: 12/470,954

(22) Filed: May 22, 2009

(65) Prior Publication Data

US 2010/0048232 A1    Feb. 25, 2010

(30) Foreign Application Priority Data

Aug. 20, 2008 (KR) .......................... 10-2008-0081390

(51) Int. Cl.
*H04B 15/00* (2006.01)
(52) U.S. Cl. .................... 455/501; 455/562.1; 455/63.1; 455/67.13; 375/267
(58) Field of Classification Search .................. 455/501, 455/562.1, 63.1, 507, 522, 69, 550.1, 575.7, 455/553.1, 95, 67.13; 370/203, 252, 260, 370/328, 329, 342, 201, 331; 375/260, 267, 375/296, 299, 316, 295
See application file for complete search history.

(56) References Cited

U.S. PATENT DOCUMENTS

| | | | |
|---|---|---|---|
| 2004/0002364 A1* | 1/2004 | Trikkonen et al. | 455/562.1 |
| 2005/0213671 A1 | 9/2005 | Wei | |
| 2008/0013644 A1* | 1/2008 | Hugl et al. | 375/295 |
| 2008/0069031 A1 | 3/2008 | Zhang et al. | |
| 2008/0117999 A1* | 5/2008 | Kadous et al. | 375/267 |
| 2009/0268840 A1* | 10/2009 | Clerckx et al. | 375/267 |
| 2009/0316567 A1* | 12/2009 | Larsson | 370/201 |
| 2010/0118782 A1* | 5/2010 | Baker et al. | 370/328 |
| 2010/0266054 A1* | 10/2010 | Mielczarek et al. | 375/260 |
| 2011/0019637 A1* | 1/2011 | Ojala et al. | 370/329 |

FOREIGN PATENT DOCUMENTS

| | | |
|---|---|---|
| JP | 2003-110464 | 4/2003 |
| JP | 2007-110664 | 4/2007 |
| KR | 10-2005-0066633 | 6/2005 |
| KR | 10-2006-0064501 | 6/2006 |
| KR | 10-2007-0046976 | 5/2007 |
| KR | 10-2008-0026010 | 3/2008 |
| WO | WO 00/72464 | 11/2000 |

\* cited by examiner

*Primary Examiner* — Tan Trinh
(74) *Attorney, Agent, or Firm* — NSIP Law

(57) ABSTRACT

A base station apparatus including a receiving unit to receive, from a terminal, quantized channel state information with respect to a radio channel from a plurality of transmission antennas of the base station apparatus to a plurality of receiving antennas of the terminal. A control unit to determine a control ratio of interference signal to noise with respect to the radio channel based on the channel state information. A precoding matrix computing unit to compute a precoding matrix based on the control ratio of interference signal to noise and a transmission unit to transmit data to one or more of the connected terminals using the precoding matrix.

17 Claims, 6 Drawing Sheets

APPARATUS AND METHOD FOR TRANSMITTING DATA BASED ON QUANTIZED CHANNEL STATE INFORMATION

CROSS-REFERENCE TO RELATED APPLICATION(S)

This application claims the benefit under 35 U.S.C. §119 (a) of a Korean Patent Application No. 10-2008-0081390, filed on Aug. 20, 2008 in the Korean Intellectual Property Office, the entire disclosure of which is incorporated herein by reference.

BACKGROUND

1. Field

The following description relates to a data transmission apparatus and method using a plurality of transmission antennas. More particularly, this description relates to a data transmission apparatus and method of generating a precoding matrix based on quantized channel state information and transmitting data using the precoding matrix.

2. Description of the Related Art

Currently, research is being conducted to provide various multimedia services, such as voice services in a radio communication environment, and to support data transmission with a relatively high quality and high speed. As a part of these studies, there has been a study for a data transmission system with multiple transmitting/receiving antennas using a spatial-domain channel. A data transmission technique using multiple transmitting/receiving antennas may use multiple antennas at both ends of a transceiver to increase a channel capacity within the limited frequency resources, thereby obtaining a high data transmission rate.

Since a transceiver using a data transmission technique with open loop multiple transmitting/receiving antennas does not require channel information, the transceiver may be configured with a relatively simple structure without wasting an uplink radio resource. However, where a spatial correlation of the channel increases, or multiple channels undergo deep fading due to difficulties in adaptively coping with changes of the channel, performance of the transceiver may significantly deteriorate.

A transceiver using a data transmission technique with multiple closed loop transmitting/receiving antennas may transmit data using channel information transmitted from a terminal. In this instance, data transmission performance is significantly improved because characteristics of the channel are applied to the transceiver. However, a base station apparatus may receive only quantized channel state information due to limitations of the bandwidth of an uplink from the terminal to the base station apparatus. The base station apparatus may not receive accurate channel state information due to quantization noise generated in a quantization process. Due to quantization noise, an accurate precoding matrix may not be computed and data transmission performance may deteriorate.

SUMMARY

In one general aspect, a base station apparatus includes a receiving unit to receive, from a terminal, quantized channel state information with respect to a radio channel from a plurality of transmission antennas of the base station apparatus to a plurality of receiving antennas of the terminal; a control unit to determine a control ratio of interference signal to noise with respect to the radio channel based on the channel state information; a precoding matrix computing unit to compute a precoding matrix based on the control ratio of interference signal to noise; and a transmission unit to transmit data to each one or more terminals using the precoding matrix.

The control unit may determine the control ratio of interference signal to noise based on a number of quantization bits of the channel state information.

The base station apparatus also may include a channel matrix generating unit to generate a radio channel state matrix with respect to the radio channel based on the received quantized channel state information; and a singular value decomposing unit to perform a singular value decomposition with respect to the radio channel state matrix, wherein the control unit determines the control ratio of interference signal to noise based on the singular value of the radio channel state matrix.

The control unit may determine the control ratio of interference signal to noise based on a number of transmission antennas of the base station apparatus and a number of the receiving antennas of the terminal.

The base station apparatus may further include a channel matrix generating unit to generate a radio channel state matrix from the plurality of transmission antennas of the base station apparatus to the plurality of receiving antennas of the terminal based on the received quantized channel state information; and a singular value decomposing unit to perform a singular value decomposition with respect to the radio channel state matrix, wherein the precoding matrix computing unit computes the precoding matrix based on results of the singular value decomposition with respect to the radio channel state matrix.

In another aspect, a data transmission method for a base station in a wireless communication system includes receiving, from a terminal at the base station, quantized channel state information with respect to a radio channel from a plurality of transmission antennas of the base station to a plurality of receiving antennas of a terminal; determining, by a control unit of the base station, a control ratio of interference signal to noise with respect to the radio channel based on the channel state information; computing, by a precoding matrix computing unit of the base station, a precoding matrix based on the control ratio of interference signal to noise; and transmitting data from the plurality of antennas of the base station to one or more terminals using the precoding matrix.

Determining the control ratio of interference signal to noise may be based on a number of quantization bits of the channel state information.

The method may further include generating, by a channel radio matrix generation unit of the base station, a radio channel state matrix with respect to the radio channel based on the received quantized channel state information; and performing, by a singular value decomposing unit of the base station, a singular value decomposition with respect to the radio channel state matrix, wherein determining the control ratio of interference signal to noise is based on the singular value of the radio channel state matrix.

Determining the control ratio of interference signal to noise may be based on a number of the transmission antennas of the base station and a number of receiving antennas of the terminal.

The method may further include generating, by a channel matrix generating unit of the base station, a radio channel state matrix from the plurality of transmission antennas of the base station to the plurality of receiving antennas of the terminal based on the received quantized channel state information; and performing, by a singular value decomposing unit of the base station, a singular value decomposition with respect to the radio channel state matrix, wherein computing the precoding matrix is based on results of the singular value decomposition with respect to the radio channel state matrix.

In yet another aspect, a computer-readable recording medium storing a program comprising instructions to cause a computer to receive quantized channel state information with respect to a radio channel from a plurality of transmission antennas of a base station to a plurality of receiving antennas of a terminal; determine a control ratio of interference signal to noise with respect to the radio channel based on the channel state information; compute a precoding matrix based on the control ratio of interference signal to noise; and transmit transmitting data to the terminal using the precoding matrix.

In another general aspect, a terminal may include a transmission unit to transmit, to a base station, quantized state information with respect to a radio channel from a plurality of transmission antennas of the base station to a plurality of reception antennas of the terminal; and a reception unit to receive data transmitted from the base station that was precoded using a precoding matrix generated based on the state information, wherein the state information was used to determine a control ratio of interference signal to noise with respect to the radio channel, and the precoding matrix is generated based on the control ratio of interference signal to noise.

The control ratio of interference signal to noise may be determined based on a number of quantization bits of the channel state information.

Other features and aspects will be apparent from the following description, drawings, and claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, apparatuses, methods, and systems described herein. Accordingly, various changes, modifications, and equivalents of the media, apparatuses, methods, and systems described herein will be suggested to those of ordinary skill in the art. Also, description of well-known functions and constructions may be omitted for increased clarity and conciseness.

Figure 1:
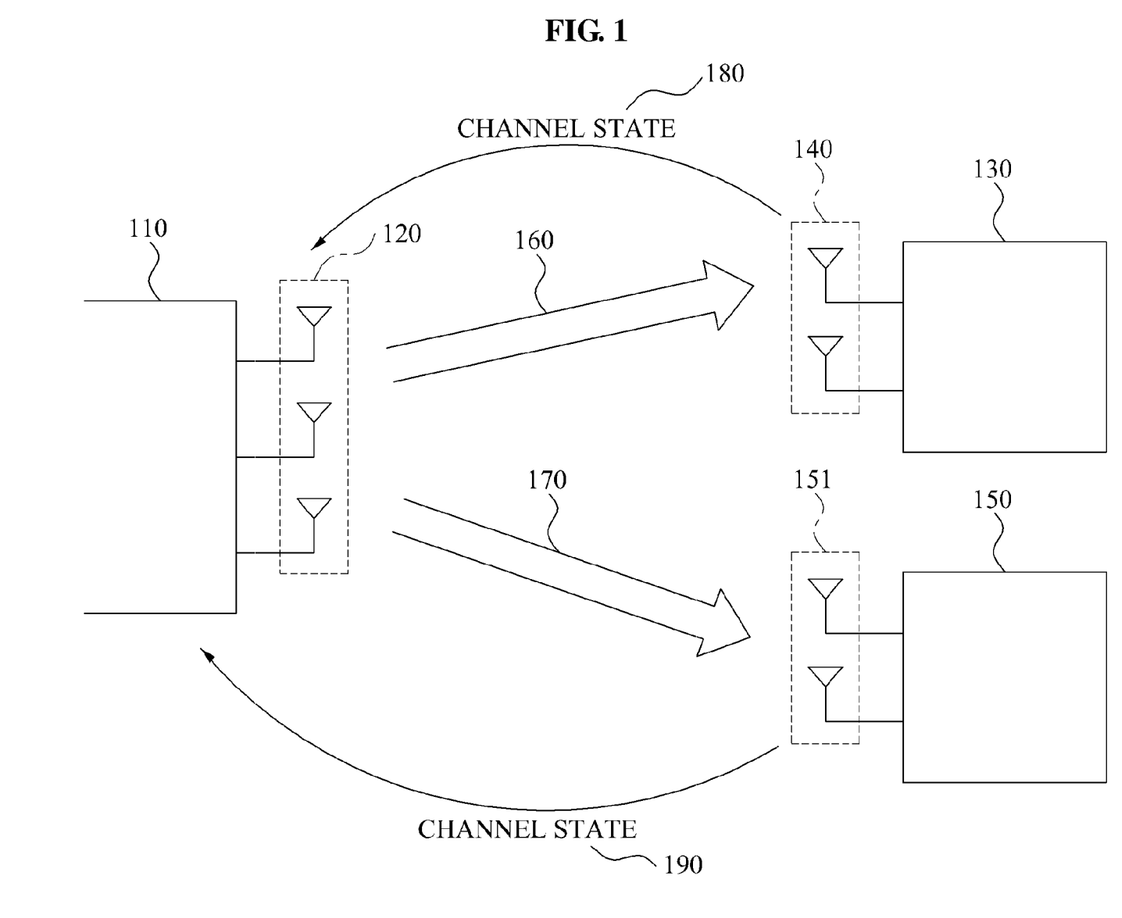
FIG. 1 is a diagram illustrating an exemplary base station apparatus receiving quantized channel state information from a terminal and transmitting data using a precoding matrix computed based on a number of quantization bits.

FIG. 1 illustrates an exemplary base station apparatus receiving quantized channel state information from a terminal and transmitting data using a precoding matrix computed based on a number of quantization bits. Hereinafter a description of computing the precoding matrix based on the number of quantization bits is described in greater detail below with reference to FIG. 1. A base station apparatus 110 includes a plurality of transmission antennas 120. Terminals 130 and 150 include a plurality of receiving antennas 140 and 151. The base station apparatus 110 transmits data to the terminals 130 and 150 using the plurality of transmission antennas 120.

So that the base station 110 may effectively transmit data to the terminals 130 and 150, downlink channel state information is acquired. The base station apparatus 110 receives downlink channel state information from the terminals 130 and 150.

The base station apparatus 110 may transmit pilot signals to each terminal 130 and 150 using the plurality of transmission antennas 120. The base station apparatus 110 may transmit to each terminal 130 and 150 pilot signals orthogonal to each other using each of the plurality of transmission antennas 120.

Each terminal 130 and 150 may estimate a radio channel from the plurality of transmission antennas 120 to receiving antennas 140 and 151, respectfully, using the pilot signals to generate channel state information. Because bandwidth of an uplink from the terminals 130 and 150 to the base station apparatus 110 is limited, the terminals 130 and 150 may not transmit the channel state information to the base station apparatus 110.

Instead, the terminals 130 and 150 may quantize the channel state information, thereby reducing an amount of information. The terminals 130 and 150 may transmit the quantized channel state information to the base station apparatus 110 in a direction indicated by arrows 180 and 190, and the base station apparatus 110 may transmit data using the quantized channel state information in a direction indicated by arrows 160 and 170.

A quantization process may be modeled by adding quantization noise to the quantization process. For example, the channel state information may lose accuracy of a value through the quantization process, and one value from among several values obtainable by the channel state information may be determined. Here, the quantization noise may be the difference between values of the channel state information before and after the quantization process.

Where it is assumed that the channel state information is quantized into B bits, the terminals 130 and 150 may accurately quantize the channel state information when B is a relatively large number. In that case, a power of the quantization noise may be considered to be significantly low. When B is a relatively small number, the power of the quantization noise may be considered to be relatively high.

A first quantization bit number for quantizing the channel state information by a first terminal 130 and a second quantization bit number for quantizing the channel state information by a second terminal 150 may differ. Where the power of the quantization noise depends on each terminal 130 and 150, the precoding matrix may be generated based on the power of the quantization noise.

An accurate precoding matrix may be calculated based on the power of the quantization noise varying according to the number of quantization bits.

Figure 2:
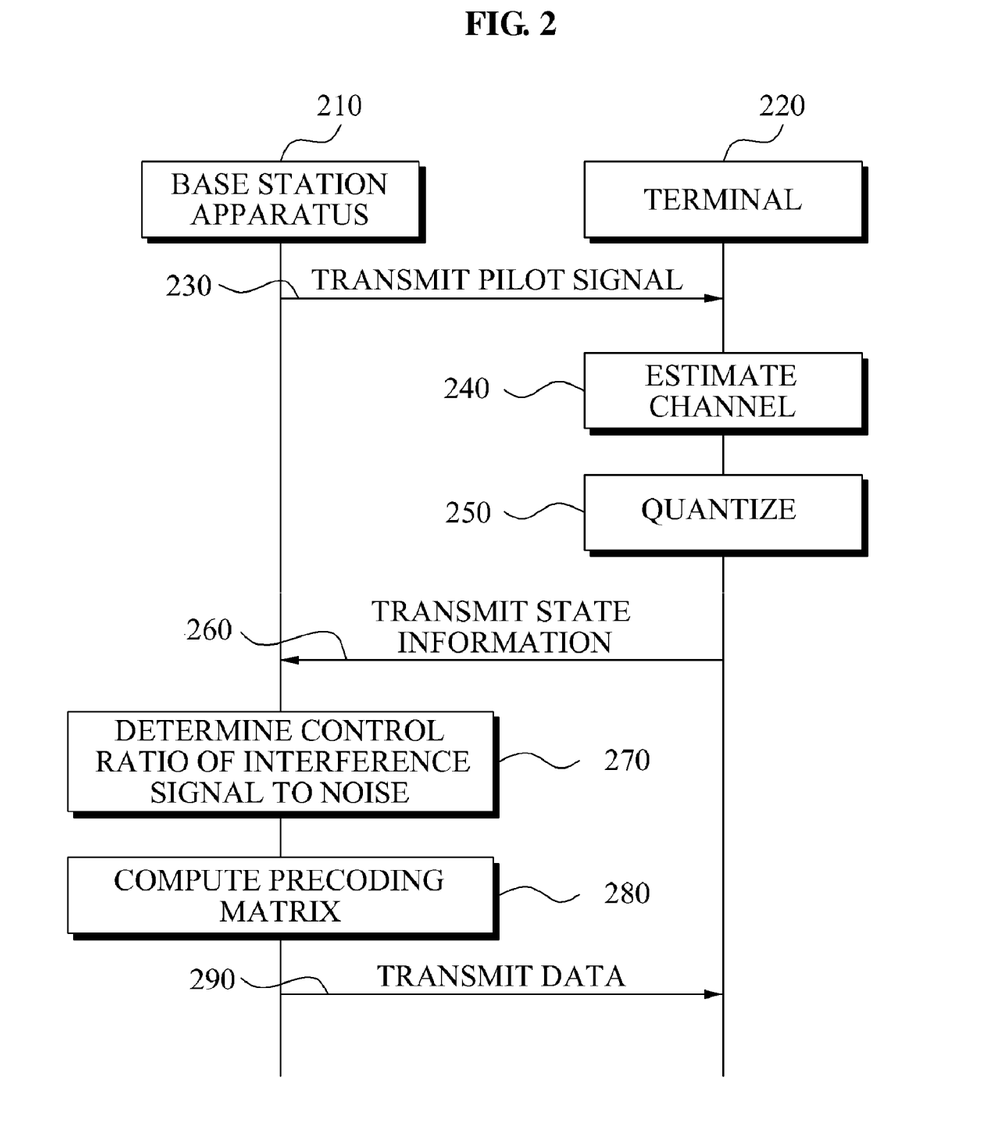
FIG. 2 is a block diagram illustrating an exemplary base station apparatus transmitting pilot signals to a terminal and transmitting data using quantized channel information generated based on the pilot signals.

FIG. 2 illustrates an exemplary base station apparatus 210 transmitting pilot signals to a terminal 220 and transmitting data using quantized channel information generated based on the pilot signals. Generating channel information using the pilot signals is described in greater detail below with reference to FIG. 2.

The base station apparatus 210 may transmit the pilot signals to a terminal 220 (230). Signals whose pattern the terminal 220 is aware of may be used as the pilot signals.

The terminal 220 may estimate a channel from a transmission antenna of the base station apparatus 210 to a receiving antenna of the terminal 220 using the pilot signals to thereby generate channel state information (240).

The terminal 220 may quantize the channel state information into B bits (250). Since B bits may have a maximum of $2^B$-numbered values, the channel state information may not be accurately expressed. Accordingly, the channel state information may be modeled as contaminated by the quantization noise. The terminal 220 may transmit the quantized channel state information to the base station apparatus 210 (260). Since a bandwidth of an uplink from the terminal 220 to the base station apparatus 210 may be limited, the terminal 220 may not transmit the channel state information to the base station apparatus 210. However, the quantized channel state information has only a limited amount of information, and the terminal 220 may transmit the quantized channel state information using the limited bandwidth.

The base station apparatus 210 may determine a control ratio of interference signal to noise (270). Where a channel state from the base station apparatus 210 to the terminal 220 is poor, strength of a downlink signal transmitting data may be significantly reduced. Downlink data transmission performance may be significantly reduced due to an effect of downlink noise.

The base station apparatus 210 may generate a precoding matrix to reduce the effect of the downlink noise (280). Where the channel state from the base station apparatus 210 to the terminal 220 is superior, strength of the downlink signal may not be significantly reduced. However, downlink data transmission performance may be reduced by the strength of an interfering signal transmitted from the base station apparatus 210 to another terminal, rather than by the downlink noise.

The base station apparatus may generate the precoding matrix to minimize the effect of the interfering signal transmitted to each terminal 220 (280). The base station apparatus 210 may compute the precoding matrix considering inaccuracy of the channel state information transmitted from the terminal 220.

The base station apparatus 210 may transmit data to the terminal 220 using the generated precoding matrix (290). The base station apparatus 210 may multiply each element of the precoding matrix by data transmitted via each antenna and may transmit the data to the terminal 220 via an antenna.

Figure 3:
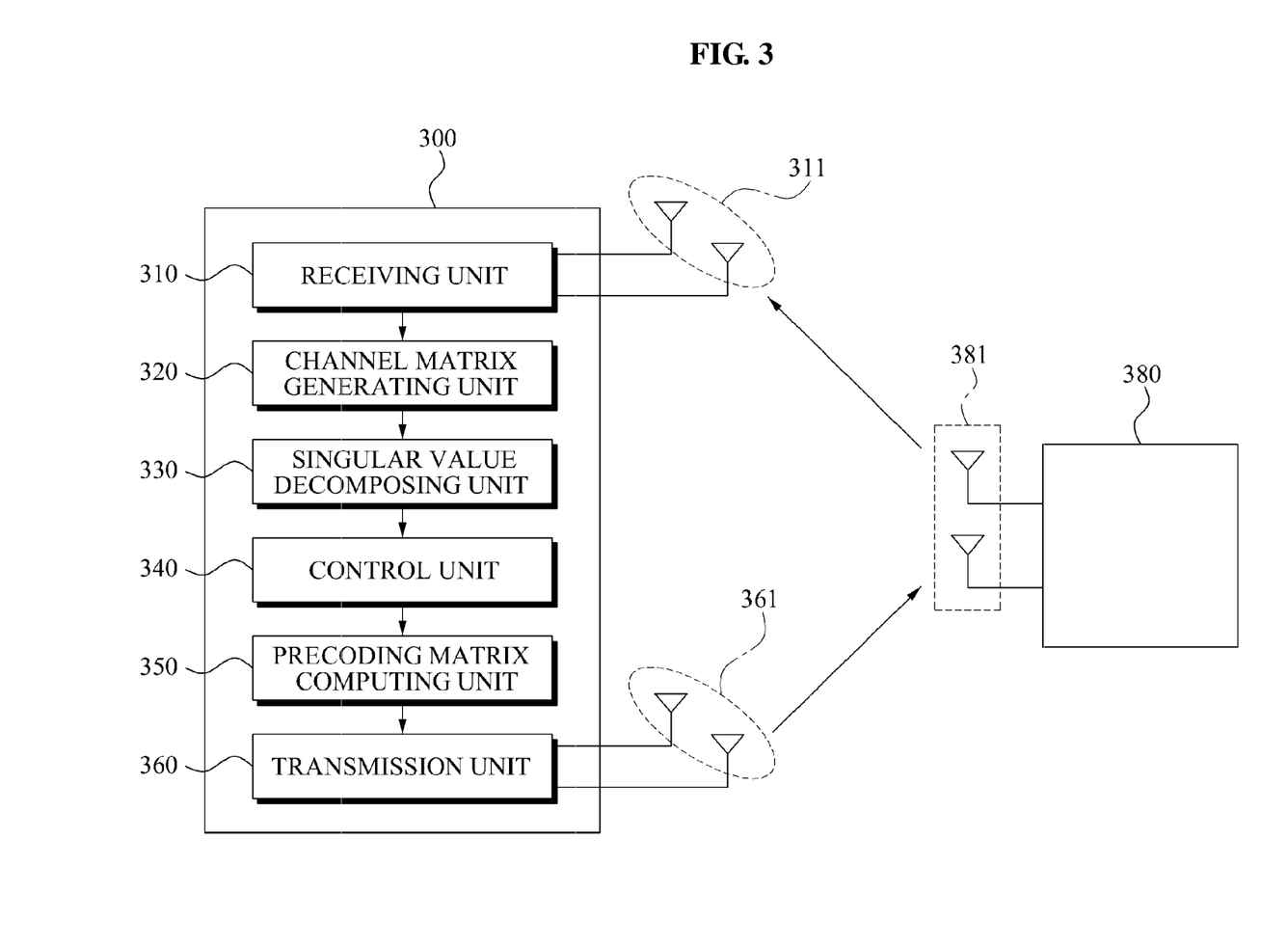
FIG. 3 is a block diagram illustrating an exemplary base station apparatus.

FIG. 3 illustrates an exemplary base station apparatus 300. Hereinafter, operation of the base station apparatus 300 is described in greater detail with reference to FIG. 3.

The base station apparatus 300 includes a receiving unit 310, a channel matrix generating unit 320, a singular value decomposing unit 330, a control unit 340, a precoding matrix computing unit 350, and a transmission unit 360.

The receiving unit 310 may receive from a terminal 380, quantized channel state information with respect to a radio channel from a plurality of transmission antennas 361 of the base station apparatus 300 to a plurality of receiving antennas 381 of the terminal 380. The base station apparatus 300 may transmit a pilot signal to the terminal 380 using the plurality of transmission antennas 361, and the terminal 380 may generate state information with respect to a radio channel using the pilot signals. The base station apparatus 300 may transmit different pilot signals for each transmission antenna 361.

The terminal 380 may quantize the channel state information into B bits, and transmit the quantized state information to the base station apparatus 300.

The control unit 320 may determine a control ratio of interference signal to noise with respect to the radio channel based on the quantized channel state information. With respect to the radio channel, the interference signal may be inaccurate when the number of quantization bits B is relatively small. When the quantized channel state information is assumed to be accurate without considering the number of quantization bits, downlink data transmission performance may not be significantly improved by generating a precoding matrix.

Where the plurality of terminals 380 are connected with the base station apparatus 300 to transmit data, signals transmitted to a specific terminal may interfere with signals transmitted to another terminal. Downlink data transmission performance may be reduced due to the interference between the terminals. The control unit 320 may determine which factor is more or less suppressed from among factors, such as noise of the downlink, interference signals between the terminals, and quantization noise.

For example, the effect of an interference signal is more suppressed than the effect of the noise when the control ratio of interference signal to noise is relatively large. Conversely, the effect of noise is more suppressed than the effect of interference signal when the control ratio is relatively small.

An effect of the quantization noise may be determined in accordance with the number of quantization bits, and thereby the control unit 320 may determine the control ratio of interference signal to noise based on the number of quantization bits of the channel state information. The receiving unit 310 may receive the number of quantization bits from the terminal 380.

The number of quantization bits B of channel state information received by the receiving unit 310 from the terminal 380 may be fixed. In this case, the receiving unit 310 and the terminal 380 are aware of the number that quantization bits is B, and by knowing such, the receiving unit 310 does not need to be informed about the number of quantization bits B from the terminal 380. For example, the base station apparatus 300 may store the same codebook as that of the terminal 380 and transmit data to the terminal 380 based on the stored codebook. Since the number of quantization bits B transmitted by the terminal 380 may be determined in accordance with a size of the codebook, the terminal 380 does not need to transmit the number of quantization bits B to the receiving unit 310 when the base station apparatus 300 stores the same codebook as that of the terminal 380.

The channel matrix generating unit 320 may generate a radio channel state matrix with respect to a radio channel from the transmission antenna 361 of the base station apparatus 300 to the receiving antennas 381 of the terminal 380 based on the quantized channel state information received by the receiving unit 310.

The singular value decomposing unit 330 may perform a singular value decomposition with respect to the radio channel state matrix.

The control unit 330 may determine the control ratio of interference signal to noise based on the results of the singular value decomposition of the singular value decomposing unit 330. The results of the singular value decomposition may include a singular value with respect to the radio channel state matrix and left and right singular matrixes.

The control unit 340 may determine the control ratio of interference signal to noise that maximizes a signal to interference plus noise ratio (SINR) of a downlink channel according to the following equation:

$$\sum_{l=1}^{KN_r}\sum_{k=1}^{l-1}\frac{\lambda_k^2\lambda_l^2(\lambda_k^2-\lambda_l^2)^2(KN_r/P-\alpha)}{(\lambda_l^2+\alpha)^3(\lambda_k^2+\alpha)^3}= \quad\text{[Equation 1]}$$

$$4KN_rq\sum\frac{\lambda_k^2}{(\lambda_k^2+\alpha)^2},$$

wherein the control ratio α of interference signal to noise may be determined to satisfy Equation 1. In Equation 1, K denotes a number of all the terminals connected with the base station apparatus, $N_r$ denotes a number of receiving antennas of each terminal, $\lambda_k$ and $\lambda_l$ respectively denote a k-th singular value and l-th singular value of the radio channel state matrix, α denotes the control ratio of interference signal to noise, P denotes a precoding matrix, and q is represented as:

$$q=\frac{1}{2}\cdot\sum_{i=0}^{N}\binom{N}{i}\cdot I_i\cdot\left[\left(\frac{1}{2}\right)^N+\left(-\frac{1}{2}\right)^i\right], \quad\text{[Equation 2]}$$

wherein B denotes the number of quantization bits with respect to the channel state information, $N=2^B$, and $I_i$ (i=0, 1, 2, ... N) is represented as: [Equation 3]

$$I_i=\int_0^1[4x(1-x)]^{i(M-1)}dx,$$

wherein M denotes a number of transmission antennas.

The control unit 340 may determine the control ratio of interference signal to noise maximizing the SINR of the downlink channel according to Equation 4 below. In this instance, the control ratio may be determined according to the number of transmission antennas of the base station apparatus and a number of receiving antennas of each terminal.

$$\alpha=\frac{KN_r}{P}+\frac{4(KN_r-1)Mq}{(KN_r)^2}, \quad\text{[Equation 4]}$$

wherein α denotes the control ratio of interference signal to noise, K denotes a number of all terminals connected with the base station apparatus, $N_r$ denotes a number of receiving antennas of each terminal, P denotes a precoding matrix, M denotes a number of transmission antennas of the base station apparatus, and q may be determined as in Equation 2 above.

According to Equation 4, an iterative operation may not need to be performed to obtain the control ratio of interference signal to noise. Because a calcuation amount used to obtain the control ratio is reduced, less time is required to calculate the control ratio. According to Equation 4, it may be capable of more effectively coping with a change in a channel over time, thereby improuding performance of the transmission system.

The precoding matrix computing unit 350 may compute the precoding matrix based on the control ratio of interference signal to noise. The precoding matrix computing unit 350 may determine the control ratio of interference signal to noise based on the results of the singular value decomposition of the singular value decomposing unit 330. The results of the singular value decomposition may include a singular value with respect to the radio channel state matrix, and left and right singular matrixes.

The precoding matrix may be determined as follows:

$$P=V\cdot\Lambda\left(\frac{\lambda}{\lambda^2+\alpha}\right)\cdot U^+\cdot D. \quad\text{[Equation 5]}$$

In Equation 5, P denotes a precoding matrix, V denotes a right singular matrix with respect to a radio channel state matrix, U denotes a left singular matrix with respect to the radio channel state matrix, + denotes a Hermitian transpose, and Λ(x) and D are respectively represented by the two following equations:

$$\Lambda(x)=\begin{bmatrix}x_1 & 0 & 0\\ 0 & \ddots & 0\\ 0 & 0 & x_n\\ 0 & 0 & 0\\ 0 & 0 & 0\end{bmatrix}, \quad\text{[Equation 6]}$$

wherein $x_n$ denotes an n-th singular value with respect to the radio channel state matrix, and $$D=\begin{bmatrix}D_{11} & 0 & 0\\ 0 & \ddots & 0\\ 0 & 0 & D_{KK}\end{bmatrix}, \quad\text{[Equation 7]}$$

wherein $D_{kk}=H_k^+\cdot T_k$, $H_k$ denotes a radio channel state matrix associated with a k-th terminal where $T_k$ is represented by the following equation:

$$T_k=\text{basis}[\Pi_1\ldots\Pi_{k-1}\Pi_{k+1}\ldots\Pi_K]^\perp. \quad\text{[Equation 8]}$$

In Equation 8, $T_k$ may be configured with a pair of vectors orthogonal to each other from among basis vectors orthogonal to a vector space where radio channel state matrixes associated with other terminals are spanned. These pair of vectors may be readily determined using a singular value decomposition.

A Signal to Noise Ratio (SNR) with respect to a downlink channel may be significantly high when a state of the downlink channel is significantly superior. Under this circumstance, the control ratio of interference signal to noise α may be a significantly small value, for example, close to "0." The precoding matrix P may have a similar type as that of a result of a zero forcing scheme when the control ratio of interference signal to noise α is significantly small.

The result of the zero forcing scheme or a result of a block decomposition scheme may be used compute the precoding matrix to minimize interference between signals transmitted to each terminal. In addition, the result of a regularized inverse scheme may be used to compute the precoding matrix to minimize the effect of the downlink noise.

Result of a regularized inverse scheme may be used to compute the precoding matrix to minimize the effect of the downlink. An effect of downlink interference signal with respect to downlink data transmission efficiency and the effect of downlink noise may be compared with each other based on the downlink channel state to thereby compute the precoding matrix in which downlink data transmission performance may be maximized.

Where the effect of downlink noise is significantly less, the precoding matrix computing unit 350 may generate the precoding matrix P minimizing the effect of the downlink interference signal generated due to the signals transmitted to each terminal so as to have a result similar to that using the zero forcing scheme or block decomposition scheme.

Where the effect of the downlink interference signal is significantly less, the precoding matrix computing unit 350 may generate the precoding matrix P minimizing the effect of the downlink noise so as to have a result similar to that using the regularized inverse scheme.

The precoding matrix computing unit 350 may generate the precoding matrix to reduce the strength of the interference signal between the terminals when the strength of the interference signal is relatively high. Where a power of downlink noise is relatively high, the precoding matrix computing unit 350 may generate the precoding matrix so that the strength of the data signal transmitted to the terminal does not becomes less than a predetermined level.

Also, the precoding matrix computing unit 350 may generate the precoding matrix based on the number of quantization bits determining the power of quantization noise.

The transmission unit 360 may transmit data to the terminal 380 using the precoding matrix computed by the precoding matrix computing unit 350. The transmission unit 360 may multiply each element of the precoding matrix by data transmitted via each antenna, and a value obtained by the multiplication may be transmitted to the terminal 380 via an antenna 361.

Figure 4:
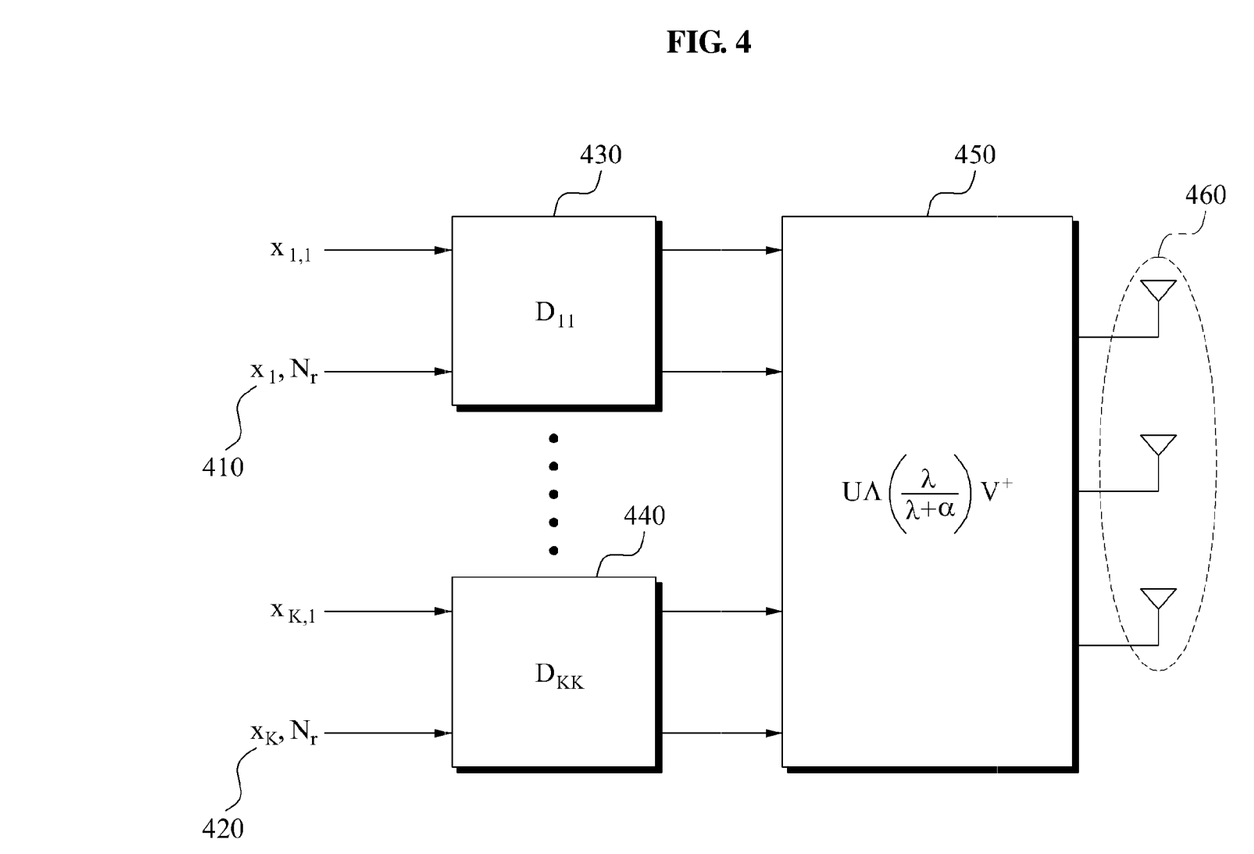
FIG. 4 is a block diagram illustrating a transmission unit of the exemplary base station apparatus shown in FIG. 3.

FIG. 4 illustrates a transmission unit of the exemplary base station apparatus shown in FIG. 3. The transmission unit 360 may include block channel generating units 430 and 440 and an interference signal eliminating unit 450.

Each block channel generating unit 430 and 440 may respectively receive $N_r$-number of data streams 410 and 420. The terminal 380 may receive the data streams 410 and 420 using $N_r$-numbered receiving antennas.

Diagonal elements of diagonal matrixes $D_{11}$ and $D_{KK}$ may be multiplied by each data stream 410 and 420. $D_{kk} = H_k^+ \cdot T_k$, and $H_k$ represent a radio channel state matrix associated with a k-th terminal. $T_k$ may be determined by Equation 8 provided above.

The base station apparatus 300 may process the data stream using K-numbered block channel generating units 430 and 440 when K-numbered terminals are connected with the base station apparatus 300 to transmit data.

The interference signal eliminating unit 450 may eliminate interference signals between the respective terminals. $N_r$-numbered data streams may be transmitted to each terminal. $N_r$-numbered first data streams transmitted to a first terminal and $N_r$-numbered second data streams transmitted to a second terminal may interfere and thereby deteriorate downlink data transmission performance. The interference signal eliminating unit 450 may eliminate interference between the first and second data streams.

Figure 5:
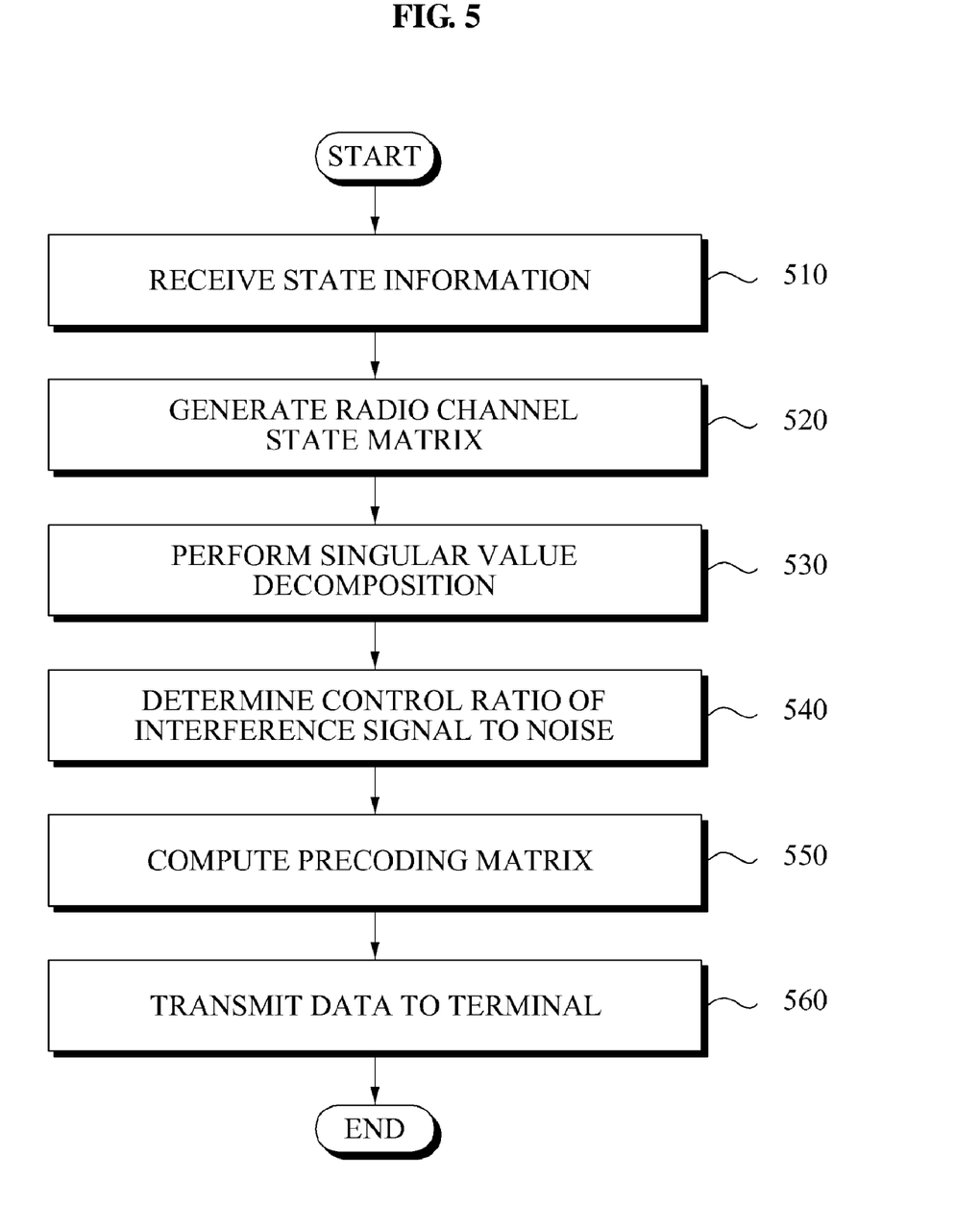
FIG. 5 is a flowchart illustrating an exemplary data transmission method.

FIG. 5 shows a flowchart of an exemplary data transmission method. The base station apparatus may receive, from a terminal, quantized channel state information with respect to a radio channel from a plurality of transmission antennas of the base station apparatus to a plurality of receiving antennas of the terminal (510). The base station apparatus may transmit pilot signals to the terminal, and the terminal may perform a channel estimation with respect to the radio channel using the pilot signals. The terminal may generate channel state information with respect to the radio channel according to the result of the channel estimation and quantize the generated channel state information.

The base station apparatus may receive a number of quantization bits B of the channel state information from the terminal. The base station apparatus may store the same codebook as that of the terminal and transmit data to the terminal based on the stored codebook. Since the number of quantization bits B of the channel state information transmitted by the terminal may be determined in accordance with a size of the codebook, the base station apparatus need not be informed by the terminal about the number of quantization bits B when the base station apparatus stores the same codebook as that of the terminal.

The base station apparatus may determine a control ratio of interference signal to noise with respect to a radio channel based on the quantized channel state information (540). A channel state from the base station apparatus to the terminal may vary over time. Accordingly, downlink data transmission performance may significantly deteriorate at some moments due to the effect of the interference signal transmitted to the plurality of terminals, and downlink data transmission performance also may significantly deteriorate at other moments due to the downlink channel noise.

The control ratio of interference signal to noise may be determined in accordance with a state of the downlink channel, so that the effect of the interference signal transmitted to the plurality of terminals may be minimized at some specific moments, and the effect of downlink channel noise may be minimized at other specific moments.

The control ratio of interference signal to noise may be determined based on the number of quantization bits B of the channel state information or the power of the quantization noise generated in the quantization process (540).

The base station apparatus may determine the control ratio of interference signal to noise so that an SINR in the downlink is maximized.

A radio channel state matrix from the transmission antenna to the receiving antenna may be generated based on the quantized channel state information (520), and a singular value decomposition with respect to the radio channel state matrix may be performed (530). The control ratio of interference signal to noise may be determined based on the result of the singular value decomposition of the radio channel state matrix (540).

The control ratio of interference signal to noise maximizing the SINR in the downlink may be determined by the following equation:

$$\sum_{l=1}^{KN_r} \sum_{k=1}^{l-1} \frac{\lambda_k^2 \lambda_l^2 (\lambda_k^2 - \lambda_l^2)^2 (KN_r/P - \alpha)}{(\lambda_l^2 + \alpha)^3 (\lambda_k^2 + \alpha)^3} =$$
$$4KN_r q \sum \frac{\lambda_k^2}{(\lambda_k^2 + \alpha)^2},$$
[Equation 9]

wherein K denotes a number of all terminals connected with a base station apparatus, $N_r$ denotes a number of receiving antennas of each terminal, $\lambda_k$ and $\lambda_l$ respectively denote a k-th singular value and 1-st singular value of the radio channel state matrix, $\alpha$ denotes the control ratio of interference singular to noise, P denotes a precoding matrix, and q is represented as:

$$q = \frac{1}{2} \cdot \sum_{i=0}^{N} \binom{N}{i} \cdot I_i \cdot \left[\left(\frac{1}{2}\right)^N + \left(-\frac{1}{2}\right)^i\right],$$ [Equation 10]

wherein $N=2^B$, where B denotes a number of quantization bits with respect to the channel state information, and where $I_i$ is represented as:

$$I_i = \int_0^1 [4x(1-x)]^{i(M-1)} dx,$$

wherein M denotes a number of transmission antennas.

The control ratio of interference signal to noise maximizing the SINR of the downlink channel also may be determined according to Equation 12 below (540). In this instance, the control ratio of Equation 12 may be determined according to a number of transmission antennas of the base station apparatus and a number of receiving antennas of each terminal. Equation 12 may be expressed as:

$$\alpha = \frac{KN_r}{P} + \frac{4(KN_r - 1)Mq}{(KN_r)^2},$$ [Equation 12]

wherein $\alpha$ denotes the control ratio of interference signal to noise, K denotes a number of all terminals connected with the base station apparatus, $N_r$ denotes a number of receiving antennas of each terminal, P denotes a precoding matrix, M denotes a number of transmission antennas of the base station apparatus, and q may be determined by Equation 10 provided above.

According to Equation 12, an iterative operation may not need to be performed to obtain the control ratio of interference signal to noise. The complexity and time to calculate the control ratio may be reduced.

The precoding matrix may be computed based on the control ratio of interference signal to noise $\alpha$ (550). The precoding matrix may be computed based on the result of the singular value decomposition with respect to the radio channel state matrix (550).

The base station apparatus may compute the precoding matrix (550) in accordance with the following equation:

$$P = V \cdot \Lambda\left(\frac{\lambda}{\lambda^2 + \alpha}\right) \cdot U^+ \cdot D,$$ [Equation 13]

wherein P denotes a precoding matrix, V denotes a right singular matrix with respect to a radio channel state matrix, U denotes a left singular matrix with respect to the radio channel state matrix, + denotes a Hermitian transpose, and $\Lambda(x)$ and D are respectively represented by the following two equations:

$$\Lambda(x) = \begin{bmatrix} x_1 & 0 & 0 \\ 0 & \ddots & 0 \\ 0 & 0 & x_N \\ 0 & 0 & 0 \\ 0 & 0 & 0 \end{bmatrix},$$ [Equation 14]

wherein $x_n$ denotes an n-th singular value with respect to the radio channel state matrix, and $$D = \begin{bmatrix} D_{11} & 0 & 0 \\ 0 & \ddots & 0 \\ 0 & 0 & D_{KK} \end{bmatrix},$$ [Equation 15]

wherein $D_{kk}=H_k^+ \cdot T_k$, $H_k$ denotes a radio channel state matrix associated with a k-th terminal, and where $T_k$ may be represented as:

$$T_k = \text{basis}[H_1 \ldots H_{k-1} H_{k+1} \ldots H_K]^\perp$$ [Equation 16]

Data may be transmitted to each terminal using the precoding matrix (560). Each element of the precoding matrix may be multiplied by data transmitted via each antenna, and a value obtained by the multiplication may be transmitted to the terminal via an antenna.

Figure 6:
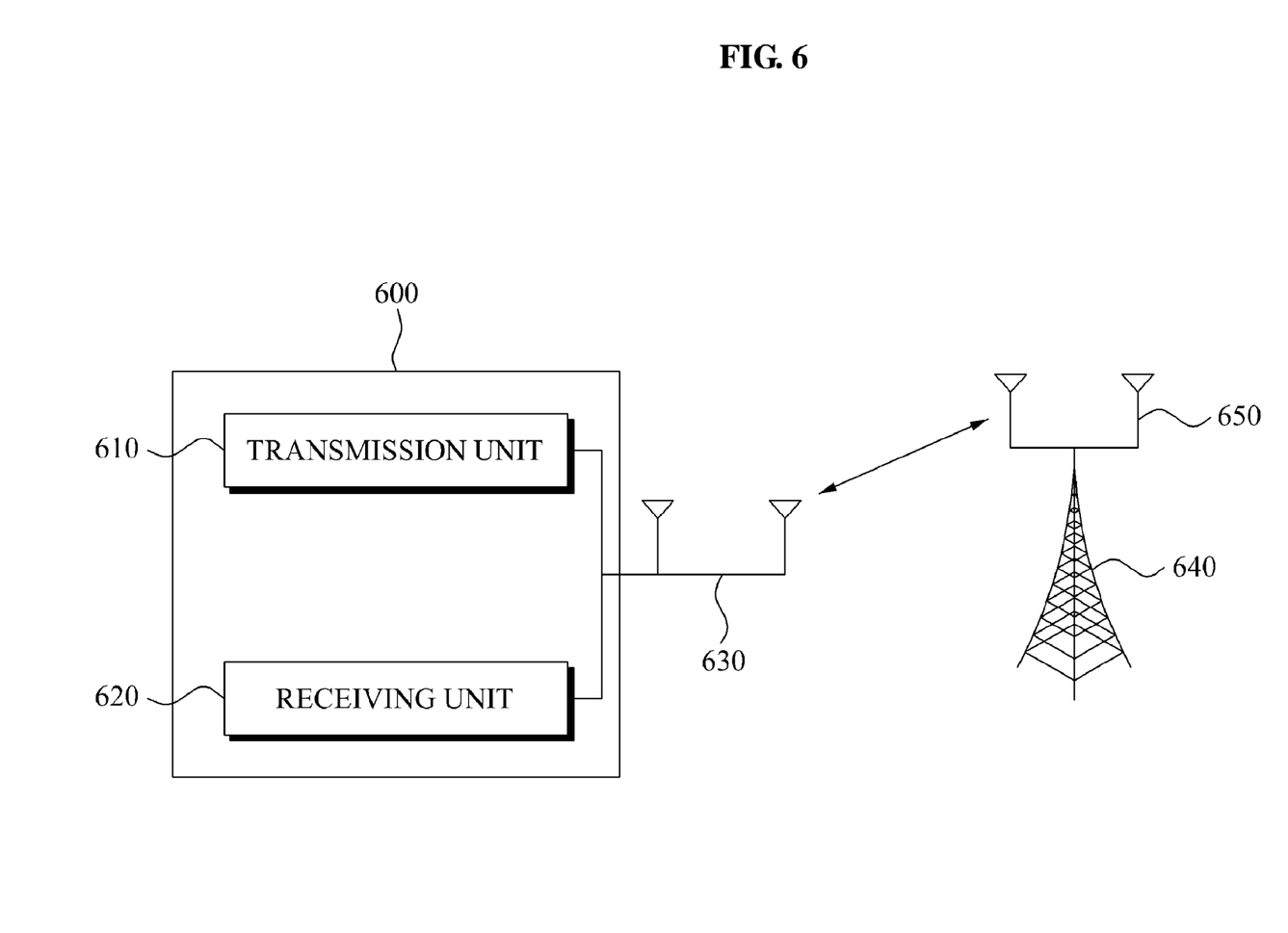
FIG. 6 is a block diagram illustrating an exemplary terminal receiving data from a base station based on quantized state information.

FIG. 6 illustrates an exemplary terminal 600 receiving data from a base station 640 based on quantized state information. The terminal 600 may include a transmission unit 610 and a reception unit 620.

The transmission unit 610 may transmit, to the base station 640, quantized state information with respect to a radio channel from the terminal 600 to the base station 640. The base station 640 may include a plurality of transmission antennas 650, and the terminal 600 may include a plurality of reception antennas 630. Accordingly, the radio channel from the plurality of transmission antennas 650 of the base station 640 to the plurality of reception antennas 630 of the terminal 600 may be a matrix type. The terminal 600 may estimate the radio channel from the plurality of transmission antennas 650 to the plurality of reception antennas 630 and quantize information about the estimated radio channel.

When the number of quantization bits of the channel state information is small, a power of quantization noise may relatively increase, and the state information received by the base station 640 may be relatively inaccurate. When the number of quantization bits of the channel state information is large, the power of quantization noise may be relatively reduced, and the state information may be relatively accurate.

The terminal 600 may determine the number of quantization bits according to the radio channel state and quantize the state information based on the determined number of quantization bits.

The reception unit 620 may receive data from the base station 650. The base station 650 may determine a control ratio of interference signal to noise with respect to the radio channel using the quantized state information.

Data transmitted using the radio channel from the plurality of transmission antennas 650 to the plurality of reception antennas 630 may be affected by the interference signal or noise. The control ratio of interference signal to noise may designate which one of the interference signal and quantization noise existing in the radio channel suppresses more. For example, an effect of the interference signal rather than an effect the quantization noise may be suppressed more than the effect of the quantization noise, when the control ratio of interference signal to noise is large. An effect of the quantization noise may be suppressed more than the effect of the interference signal when the control ratio thereof is small.

The base station 650 may output a precoding matrix based on the control ratio of interference signal to noise. When the control ratio of interference signal to noise is large, the precoding matrix may be generated so as to suppress the effect of the interference signal rather than the effect of the quantization noise.

The base station 640 may determine the control ratio of interference signal to noise based on the number of quantization bits of the state information. The quantization noise may be determined depending on the number of quantization bits. The base station 640 may receive the number of quantization bits from the terminal 600, and estimate a strength of quantization noise with respect to the state information. The base station 640 may output the precoding matrix to suppress the interference signal based on the estimated strength of quantization noise.

The base station 650 may transmit the data to the terminal 600 using the precoding matrix.

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media, such as hard disks, floppy disks, and magnetic tape; optical media such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices and units may be configured to act as one or more software modules in order to perform the operations and/or methods described above in combination with a processor, computer, and/or computing device.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station apparatus, comprising:
a receiving unit configured to receive, from a terminal, quantized channel state information with respect to a radio channel from a plurality of transmission antennas of the base station apparatus to a plurality of receiving antennas of the terminal;
a channel matrix generating unit configured to generate a radio channel state matrix with respect to the radio channel based on the received quantized channel state information;
a singular value decomposing unit configured to perform a singular value decomposition with respect to the radio channel state matrix;
a control unit configured to determine a control ratio of interference signal to noise with respect to the radio channel based on the singular value of the radio channel state matrix;
a precoding matrix computing unit configured to compute a precoding matrix based on the control ratio of interference signal to noise; and
a transmission unit configured to transmit data to one or more terminals using the precoding matrix.

2. The base station apparatus of claim 1, wherein the control ratio of interference signal to noise is based on a number of quantization bits of the channel state information.

3. The base station apparatus of claim 1, wherein the control ratio of interference signal to noise satisfies the following equation:

$$\sum_{l=1}^{KN_r}\sum_{k=1}^{l-1}\frac{\lambda_k^2\lambda_l^2(\lambda_k^2-\lambda_l^2)^2(KN_r/P-\alpha)}{(\lambda_l^2+\alpha)^3(\lambda_k^2+\alpha)^3}=4KN_rq\sum\frac{\lambda_k^2}{(\lambda_k^2+\alpha)^2},$$

wherein K denotes a number of all terminals connected to the base station apparatus, $N_r$ denotes a number of receiving antennas of each of the connected terminals, $\lambda_k$ and $\lambda_l$ respectively denote a k-th singular value and l-th singular value of the radio channel state matrix, $\alpha$ denotes the control ratio of interference signal to noise, P denotes the precoding matrix, and where q is represented as:

$$q=\frac{1}{2}\cdot\sum_{i=0}^{N}\binom{N}{i}\cdot I_i\cdot\left[\left(\frac{1}{2}\right)^N+\left(-\frac{1}{2}\right)^i\right],$$

wherein $N=2^B$, where B denotes a number of quantization bits with respect to the channel state information, and $I_i$ (i=0, 1, 2, ..., N) is represented as:

$$I_i=\int_0^1[4x(1-x)]^{i(M-1)}\,dx,$$

wherein M denotes a number of the transmission antennas.

4. The base station apparatus of claim 1, wherein the control ratio of interference signal to noise is based on a number of the transmission antennas of the base station apparatus and a number of the receiving antennas of the terminal.

5. The base station apparatus of claim 4, wherein the control unit determines the control ratio of interference signal to noise according to the following equations:

$$\alpha=\frac{KN_r}{P}+\frac{4(KN_r-1)Mq}{(KN_r)^2},$$

wherein $\alpha$ denotes the control ratio of interference signal to noise, K denotes a number of all terminals connected with the base station apparatus, $N_r$ denotes a number of receiving antennas of each of the connected terminals, P denotes the precoding matrix, M denotes a number of the transmission antennas of the base station apparatus, and where q is determined by the following equation:

$$q=\frac{1}{2}\cdot\sum_{i=0}^{N}\binom{N}{i}\cdot I_i\cdot\left[\left(\frac{1}{2}\right)^N+\left(-\frac{1}{2}\right)^i\right],$$

wherein $N=2^B$, where B denotes a number of quantization bits with respect to the channel state information, and where $I_i$ (i=0, 1, 2, ... N) is represented as:

$$I_i = \int_0^1 [4x(1-x)]^{i(M-1)} dx.$$

6. The base station apparatus of claim 1,
wherein the precoding matrix computing unit computes the precoding matrix based on results of the singular value decomposition with respect to the radio channel state matrix.

7. The base station apparatus of claim 6, wherein the precoding matrix is represented as:

$$P = V \cdot \Lambda\left(\frac{\lambda}{\lambda^2 + \alpha}\right) \cdot U^+ \cdot D,$$

wherein P denotes the precoding matrix, V denotes a right singular matrix with respect to the a radio channel state matrix, U denotes a left singular matrix with respect to the radio channel state matrix, + denotes a Hermitian transpose, $\Lambda(x)$ and D are, respectively, as the following equations:

$$\Lambda(x) = \begin{bmatrix} x_1 & 0 & 0 \\ 0 & \ddots & 0 \\ 0 & 0 & x_N \\ 0 & 0 & 0 \\ 0 & 0 & 0 \end{bmatrix},$$

wherein $x_n$ denotes an n-th singular value with respect to the radio channel state matrix, and $$D = \begin{bmatrix} D_{11} & 0 & 0 \\ 0 & \ddots & 0 \\ 0 & 0 & D_{KK} \end{bmatrix},$$

wherein $D_{kk} = H_k^+ \cdot T_k$, $H_k$ denotes a radio channel state matrix associated with a k-th terminal, and $T_k$ is represented as:

$$T_k = \text{basis}[H_1 \ldots H_{k-1} H_{k+1} \ldots H_K]^\perp.$$

8. A data transmission method for a base station in a wireless communication system, the method comprising:
receiving, from a terminal at the base station, quantized channel state information with respect to a radio channel from a plurality of transmission antennas of the base station to a plurality of receiving antennas of the terminal;
generating, by a channel radio matrix generation unit of the base station, a radio channel state matrix with respect to the radio channel based on the received quantized channel state information;
performing, by a singular value decomposing unit of the base station, a singular value decomposition with respect to the radio channel state matrix;
determining, by a control unit of the base station, a control ratio of interference signal to noise with respect to the radio channel based on the singular value of the radio channel state matrix;
computing, by a precoding matrix computing unit of the base station, a precoding matrix based on the control ratio of interference signal to noise; and
transmitting data from the plurality of antennas of the base station to one or more terminals using the precoding matrix.

9. The method of claim 8, wherein the control ratio of interference signal to noise is based on a number of quantization bits of the channel state information.

10. The method of claim 8, wherein the control ratio of interference reference signal to noise satisfies the following equation:

$$\sum_{l=1}^{KN_r} \sum_{k=1}^{l-1} \frac{\lambda_k^2 \lambda_l^2 (\lambda_k^2 - \lambda_l^2)^2 (KN_r/P - \alpha)}{(\lambda_l^2 + \alpha)^3 (\lambda_k^2 + \alpha)^3} = 4KN_r q \sum \frac{\lambda_k^2}{(\lambda_k^2 + \alpha)^2},$$

wherein K denotes a number of all terminals connected to the base station apparatus, $N_r$ denotes a number of receiving antennas of each of the connected terminals, P denotes the precoding matrix, $\lambda_k$ and $\lambda_l$ respectively denote a k-th singular value and l-st singular value of the radio channel state matrix, $\alpha$ denotes the control ratio of interference singular to noise, and q is represented as:

$$q = \frac{1}{2} \cdot \sum_{i=0}^{N} \binom{N}{i} \cdot I_i \cdot \left[\left(\frac{1}{2}\right)^N + \left(-\frac{1}{2}\right)^i\right],$$

wherein $N = 2^B$, where B denotes a number of quantization bits with respect to the channel state information, and $I_i (i = 0, 1, 2, \ldots N)$ is represented as:

$$I_i = \int_0^1 [4x(1-x)]^{i(M-1)} dx,$$

wherein M denotes the number of the transmission antennas of the base station.

11. The method of claim 8, wherein the control ratio of interference signal to noise is based on a number of the transmission antennas of the base station and a number of the receiving antennas of the terminal.

12. The method of claim 11, wherein determining the control ratio of interference signal to noise is calculated in accordance with:

$$\alpha = \frac{KN_r}{P} + \frac{4(KN_r - 1)Mq}{(KN_r)^2},$$

wherein $\alpha$ denotes the control ratio of interference signal to noise, K denotes a number of all terminals connected with the base station apparatus, $N_r$ denotes a number of receiving antennas of each of the connected terminals, P denotes the precoding matrix, M denotes a number of the transmission antennas of the base station apparatus, and q is represented as:

$$q = \frac{1}{2} \cdot \sum_{i=0}^{N} \binom{N}{i} \cdot I_i \cdot \left[\left(\frac{1}{2}\right)^N + \left(-\frac{1}{2}\right)^i\right],$$

wherein $N=2^B$, where B denotes a number of quantization bits with respect to the channel state information, and $I_i$ (i=0, 1, 2, ... N) is represented as:

$$I_i = \int_0^1 [4x(1-x)]^{i(M-1)} dx.$$

13. The method of claim 8, wherein computing the precoding matrix is based on results of the singular value decomposition with respect to the radio channel state matrix.

14. The method of claim 13, wherein the precoding matrix is represented as:

$$P = V \cdot \Lambda\left(\frac{\lambda}{\lambda^2+\alpha}\right) \cdot U^+ \cdot D,$$

wherein P denotes the precoding matrix, V denotes a right singular matrix with respect to the radio channel state matrix, U denotes a left singular matrix with respect to the radio channel state matrix, + denotes a Hermitian transpose, and $\Lambda(x)$ and D are respectively represented as:

$$\Lambda(x) = \begin{bmatrix} x_1 & 0 & 0 \\ 0 & \ddots & 0 \\ 0 & 0 & x_N \\ 0 & 0 & 0 \\ 0 & 0 & 0 \end{bmatrix},$$

wherein $x_n$ denotes an n-th singular value with respect to the radio channel state matrix, and $$D = \begin{bmatrix} D_{11} & 0 & 0 \\ 0 & \ddots & 0 \\ 0 & 0 & D_{KK} \end{bmatrix},$$

wherein $D_{kk} = H_k^+ \cdot T_k$, $H_k$ denotes a radio channel state matrix associated with a k-th terminal, and $T_k$ is represented as:

$$T_k = \text{basis}[H_1 \ldots H_{k-1} H_{k+1} \ldots H_K]^\perp.$$

15. A computer-readable recording medium storing a program comprising instructions to cause a computer to:
receive quantized channel state information with respect to a radio channel from a plurality of transmission antennas of a base station to a plurality of receiving antennas of a terminal;
generate a radio channel state matrix with respect to the radio channel based on the received quantized channel state information;
perform a singular value decomposition with respect to the radio channel state matrix;
determine a control ratio of interference signal to noise with respect to the radio channel based on the singular value of the radio channel state matrix;
compute a precoding matrix based on the control ratio of interference signal to noise; and
transmit transmitting data to the terminal using the precoding matrix.

16. A terminal comprising:
a transmission unit configured to transmit, to a base station, quantized state information with respect to a radio channel from a plurality of transmission antennas of the base station to a plurality of reception antennas of the terminal; and
a reception unit configured to receive data transmitted from the base station that was precoded using a precoding matrix generated based on the state information, wherein
the state information was used to generate a radio channel state matrix with respect to the radio channel based on the received quantized channel state information, and the precoding matrix is generated based on a control ratio of interference signal to noise that is determined based on a singular value of the radio channel state matrix.

17. The terminal of claim 16, wherein the control ratio of interference signal to noise is further based on a number of quantization bits of the channel state information.

* * * * *